United States Patent
Gurbuz et al.

(10) Patent No.: US 7,567,537 B1
(45) Date of Patent: Jul. 28, 2009

(54) POINT-TO-POINT MAC PROTOCOL FOR HIGH SPEED WIRELESS BRIDGING

(75) Inventors: Ozgur Gurbuz, Ankara (TR); Ender Ayanoglu, Santa Clara, CA (US); Robert Meier, Cuyahoga Falls, OH (US)

(73) Assignee: Cisco Technology, Inc., San Jose, CA (US)

( * ) Notice: Subject to any disclaimer, the term of this patent is extended or adjusted under 35 U.S.C. 154(b) by 917 days.

(21) Appl. No.: 10/207,694

(22) Filed: Jul. 29, 2002

(51) Int. Cl.
*H04Q 7/24* (2006.01)
*H04L 12/413* (2006.01)

(52) U.S. Cl. .................. 370/338; 370/445

(58) Field of Classification Search .......... 370/310, 370/328, 338, 443, 445, 447, 449, 461, 462
See application file for complete search history.

(56) References Cited

U.S. PATENT DOCUMENTS

| | | | | |
|---|---|---|---|---|
| 5,081,623 A * | 1/1992 | Ainscow | ................ | 370/451 |
| 5,235,592 A * | 8/1993 | Cheng et al. | ................ | 370/451 |
| 5,627,829 A * | 5/1997 | Gleeson et al. | ................ | 370/469 |
| 5,819,058 A * | 10/1998 | Miller et al. | ................ | 712/210 |
| 5,844,905 A * | 12/1998 | McKay et al. | ................ | 370/443 |
| 6,075,787 A * | 6/2000 | Bobeck et al. | ................ | 370/395.2 |
| 6,097,700 A * | 8/2000 | Thornberg et al. | ................ | 370/233 |
| 6,349,138 B1 * | 2/2002 | Doshi et al. | ................ | 380/200 |
| 6,370,144 B1 * | 4/2002 | Chao et al. | ................ | 370/395.42 |
| 6,611,521 B1 * | 8/2003 | McKay et al. | ................ | 370/432 |
| 6,671,741 B1 * | 12/2003 | Dillon | ................ | 709/250 |
| 6,744,776 B1 * | 6/2004 | Kalkunte et al. | ................ | 370/412 |
| 6,775,284 B1 * | 8/2004 | Calvignac et al. | ................ | 370/392 |
| 6,788,704 B1 * | 9/2004 | Lindsay | ................ | 370/465 |
| 6,813,260 B1 * | 11/2004 | Fogle | ................ | 370/448 |
| 6,950,404 B2 * | 9/2005 | Pearl | ................ | 370/252 |
| 6,970,459 B1 * | 11/2005 | Meier | ................ | 370/389 |
| 6,996,100 B1 * | 2/2006 | Haartsen | ................ | 370/450 |
| 7,031,249 B2 * | 4/2006 | Kowalski | ................ | 370/445 |
| 2002/0178250 A1 * | 11/2002 | Haartsen | ................ | 709/223 |

OTHER PUBLICATIONS

Duke Lee, Wireless Token Ring Protocol, Spring 2001, CiteSeer, pp. 1-90.*
Part 11: Wireless LAN Medium Access Control (MAC) and Physical Layer (PHY) Specifications, ANSI/IEEE Std. 802.11, 1999 Edition.
"Part 11: Wireless LAN Medium Access Control (MAC) and Physical Layer (PHY) Specifications, High-Speed Physical Layer in the 5 GHz Band", IEEE Std. 802.11A, 1999.

* cited by examiner

*Primary Examiner*—Seema S Rao
*Assistant Examiner*—Nittaya Juntima
(74) *Attorney, Agent, or Firm*—Cindy Kaplan

(57) ABSTRACT

Systems and methods for improving throughput in point-to-point wireless communication links are provided. In one particular implementation, a media access control (MAC) layer of the IEEE 802.11 standard is enhanced for use in point-to-point links to take advantage of the limited number of nodes participating in the link. In one embodiment, a master/slave type protocol provides contention free operation between two wireless nodes. Multiple priority levels and voice traffic may be accommodated with guaranteed Quality of Service.

24 Claims, 12 Drawing Sheets

POINT-TO-POINT MAC PROTOCOL FOR HIGH SPEED WIRELESS BRIDGING

BACKGROUND OF THE INVENTION

The present invention relates to data networking and more particularly to wireless communication links.

Wireless local area networks are increasingly being used to provide network access within corporate buildings and campuses. Most of these networks are based on the IEEE 802.11 standard. With the advent of systems that are based on the 802.11a and 802.11g variants of the standard physical layer, data rates are increasing to, e.g., 54 Mbps.

One particular application that benefits especially from increased data rates is inter-building communication using wireless bridges. These are point-to-point links and have typically been implemented with simple changes in normal IEEE 802.11 configurations. Thus, these point-to-point links operate at both the media access control (MAC) layer and physical layer in a similar manner to the point-to-multipoint in-building networks.

A problem arises in that the 802.11 MAC layer relies on techniques such as contention and polling so as to accommodate the need to share access among numerous devices. The delays imposed by the required inter-device coordination represents an "overhead" when considering the overall throughput. In the inter-building point-to-point applications, additional delay is imposed by the propagation time between the bridges. Even as physical layer bandwidth capabilities improve, these delays remain and thus become primary obstacles to improved performance in point-to-point links.

What is needed are systems and methods for improving throughput of point-to-point wireless links.

SUMMARY OF THE INVENTION

By virtue of one embodiment of the present invention, systems and methods for improving throughput in point-to-point wireless communication links are provided. In one particular implementation, a media access control (MAC) layer of the IEEE 802.11 standard is enhanced for use in point-to-point links to take advantage of the limited number of nodes participating in the link. In one embodiment, a master/slave type protocol provides contention free operation between two wireless nodes. Multiple priority levels and voice traffic may be accommodated with guaranteed Quality of Service.

According to a first aspect of the present invention, a method for operating an IEEE 802 node to participate in a point-to-point wireless communication link includes: exchanging control of a shared medium with a node constituting an opposite side of the point-to-point link without contention and without polling, and transmitting data when in control of the shared medium.

According to a second aspect of the present invention, a method for operating an IEEE 802 node to participate in a point-to-point wireless communication link includes: at a MAC layer processor, receiving data from a higher layer protocol, inserting the data into a packet, the packet not including a duration field, and transmitting the packet.

Further understanding of the nature and advantages of the inventions herein may be realized by reference to the remaining portions of the specification and the attached drawings.

DESCRIPTION OF SPECIFIC EMBODIMENTS

Figure 1:
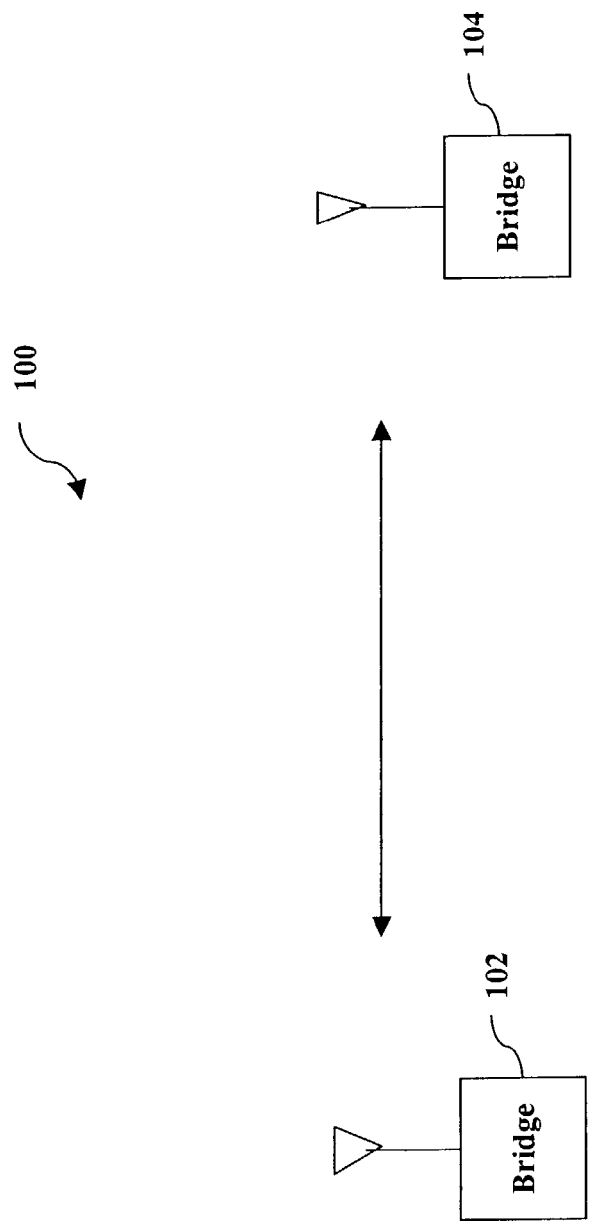
FIG. 1 depicts a wireless communication link according to one embodiment of the present invention.

FIG. 1 depicts a representative wireless communication link 100 to which embodiments of the present invention may be applied. Communication link 100 interconnects two nodes 102 and 104 which may be wireless bridges. Nodes 102 and 104 both transmit and receive on a shared frequency allocation and thus should coordinate access to the wireless communication medium. In one embodiment, wireless bridges 102 and 104 interoperate in accordance with the IEEE 802.11 standard enhanced and extended as described herein. In one particular implementation, the physical layer interaction is defined by the IEEE 802.11a standard. Other implementations may be based on, e.g., the IEEE 802.11g standard, etc. Any wireless communication protocol suite consistent with the present invention may be used.

The following documents include descriptions of the operation of the IEEE 802.11 MAC layer and a physical layer based on Orthogonal Frequency Division Multiplexing (OFDM).

Information technology—Telecommunications and information exchange between systems—Local and metropolitan area networks specific requirements—Part 11: Wireless LAN Medium Access Control (MAC) and Physical Layer (PHY) Specifications (IEEE 1999).

Information technology—Telecommunications and information exchange between systems—Local and metropolitan area networks specific requirements—Part 11: Wireless LAN Medium Access Control (MAC) and Physical Layer (PHY) Specifications (IEEE 1999): High Speed Physical Layer in the 5 GHz band.

The contents of these documents are incorporated by reference herein for all purposes.

According to embodiments of the present invention, rather than using the contention and polling techniques provided by the IEEE 802.11 standard to communicate, MAC layer overhead is reduced by having nodes 102 and 104 exchange control of the medium in accordance with certain rules as set forth below. By reducing MAC layer overhead, throughput is increased, better exploiting the capabilities of the physical layer. Operation is contention free. Multiple priority levels with guaranteed Quality of Service and voice traffic may be accommodated. Management and security features of the 802.11 standard may be preserved.

One of bridges 102 and 104 is configured as the master while the other node is configured as a slave. The master bridge has higher priority in initiating the data transfer, analogous to the point coordination function provided by IEEE 802.11 operation. The master bridge is also responsible for sending beacon transmissions as provided by the 802.11 standard.

To begin communications, both bridges sense the wireless medium and defer if a transmission is detected. The master bridge defers by PIFS (Point Coordination Function Interframe Space as defined by the 802.11 standard) while the slave bridge defers by DIFS (Distributed Coordination Function Interframe Space as defined by the 802.11 standard). PIFS represents a shorter period than DIFS. If a collision results, both bridges will not receive an acknowledgement and they will defer their transmissions again. Since the master bridge, having higher priority, defers for a shorter period of time, it will gain control of the channel. Afterwards, the bridges exchange control of the medium without the use of contention. When there is no further traffic to send, the bridges go silent, reducing interference to adjacent networks.

There are two modes of operation, an alternating mode and a burst mode. In alternating mode, a bridge sends a single packet and waits for a response with an acknowledgement before sending again. The responding bridge can piggyback data with the acknowledgement. In burst mode, a bridge sends a number of packets consecutively in a burst. The other bridge delays its response until the end of the burst. As in the alternating mode, data can be sent together with acknowledgements. When errors arise, data packets are retransmitted while voice packets do not require retransmission. Multiple packets may be concatenated into a single longer packet to further reduce MAC layer overhead when channel conditions are good and retransmissions unlikely.

Figure 2:
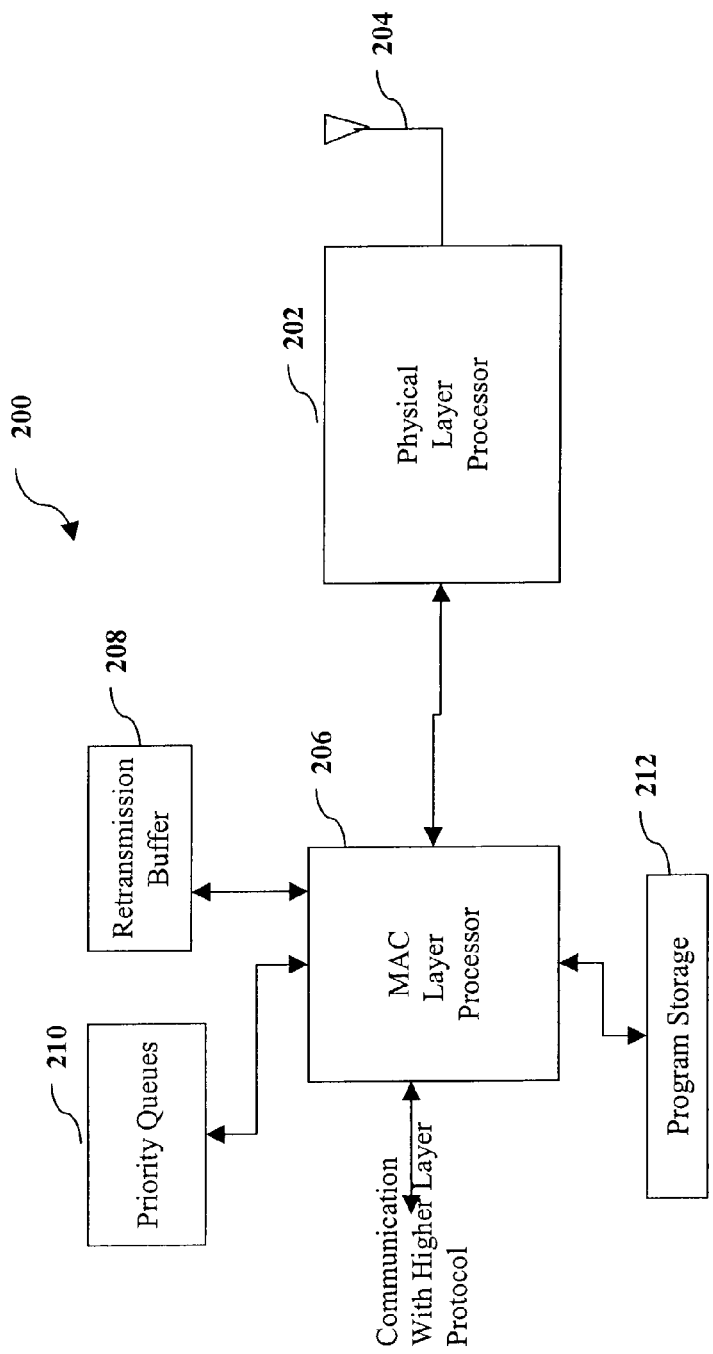
FIG. 2 depicts elements of a wireless bridge according to one embodiment of the present invention.

FIG. 2 depicts elements of a wireless bridge 200 according to one embodiment of the present invention. A physical layer processor 202 performs physical layer digital and analog functions including encoding/decoding, formation of OFDM symbols to be transmitted, recovery of data from received OFDM symbols, digital to analog and analog to digital conversion, and analog functions such as power amplification of signals to be transmitted, low noise amplification of received signals, filtering, upconversion and downconversions, etc. The operation of physical layer processor 202 may be governed by the IEEE 802.11a standard. Physical layer processor 202 transmits and receives radio signals via an antenna 204.

A MAC layer processor 206 implements the IEEE 802.11 MAC layer as modified and extended by embodiments other present invention. MAC layer processor 206 forms MAC layer packets to be transmitted and extracts data from received MAC layer packets. Data is relayed to and from hardware and software implementing higher layer protocols. MAC layer processor 206 also times transmission and reception as described herein. A retransmission buffer 208 stores transmitted packets to allow for retransmission when timely acknowledgement is not received.

Packets to be initially transmitted may be selected from a series of 8 priority queues 210. A strict priority queuing scheme is preferably used with packets from lower priority queues being selected for transmission only if all high priority queues are clear. Voice packets may be assigned to the highest priority queue to provide guaranteed quality of service.

A program storage block 212 constitutes a computer-readable storage medium that may store software instructions that implement features of the present invention. MAC layer processor 206 may, consistent with the present invention, be implemented as hardware, software, or any combination thereof. Program storage block 212 may itself be implemented as a read only memory (ROM), programmable read only memory (PROM), flash memory, or other appropriate storage device. Long term program storage may be provided by any appropriate medium including magnetic disc, CD-ROM, DVD-ROM, etc. Another example of the application of a storage medium to the present invention is transmission of software over a network such as the Internet.

Figure 3:
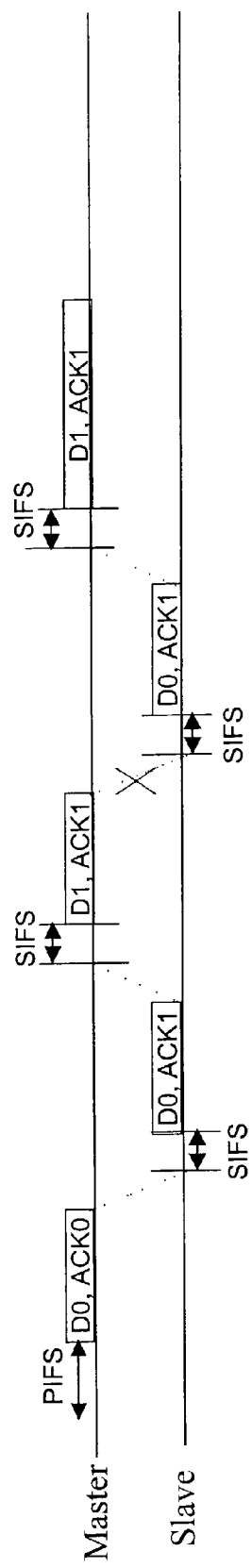
FIG. 3 is a timing diagram depicting communication across a link in a mode where one end of the link transmits a single packet before giving up control to the other end according to one embodiment of the present invention.

FIG. 3 is a timing diagram depicting the operation of alternating mode according to one embodiment of the present invention. Either the master bridge or slave bridge begins transmission by sending a data plus acknowledgement packet. The other bridge responds with a data plus acknowledgement packet if it has data to transmit or otherwise with an acknowledgement only packet. Control of the wireless medium alternates between the two bridges with a single packet being transmitted during each "turn". A period of SIFS (Shortest Interframe Space) separates the packets.

Each packet includes a packet sequence number (Dx in FIG. 3) and an acknowledgement number (ACKx in FIG. 3). The acknowledgement number indicates the next packet sequence number expected. If the new acknowledgement number has not incremented as expected, this is equivalent to a non-acknowledgement. FIG. 3 shows a sequence where the master transmits an acknowledgement plus data packet D0 and the slave responds with an acknowledgement plus data packet D0 including ACK1 to indicate that its next expected received packet is D1. The master then transmits D1 with an acknowledgement ACK1. This second transmission by the master is not received or is marked as received in error by the physical layer decoding process. During the next transmission period, the slave retransmits D0 since its acknowledgement was not received. ACK1 is sent along with D0 to indicate that the slave is still waiting for D1. Since the sequence number of the next expected packet has not incremented, the master knows to retransmit D1. Data packets are retransmitted until a configurable retry limit is exhausted. In many implementations, voice packets are not retransmitted to control latency.

Figure 4:
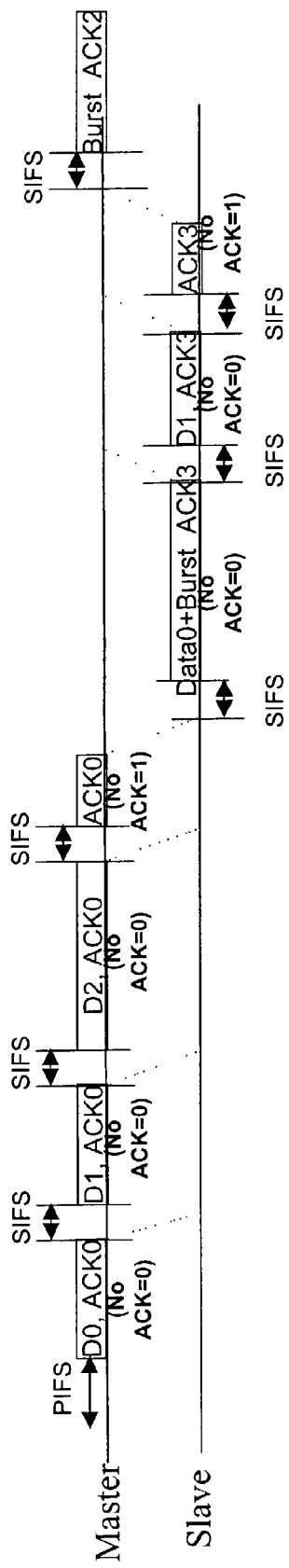
FIG. 4 is a timing diagram depicting communication across a link in a mode where one end of the link transmits multiple consecutive packets before giving up control to the other end according to one embodiment of the present invention.

FIG. 4 is a timing diagram depicting the operation of burst mode according to one embodiment of the present invention. In burst mode, the bridge controlling access to the wireless medium sends packets consecutively, each separated by a period of SIFS. A "No ACK" bit is set in the transmitted packet to cause the receiving bridge to delay acknowledgement. At the end of each multi-packet burst, an acknowledgement message is sent, releasing the medium for the other bridge. This final packet has its "No ACK" bit cleared to request acknowledgement. The response acknowledgement may have piggybacked data and may or may not start another burst by setting its own "No ACK" bit. The acknowledgement includes a bit map that specifies which packets in the previous burst were correctly received. Only missing packets need be retransmitted. The maximum number of consecutive packets sent in burst mode should be determined based on jitter requirements necessary to support voice traffic in any particular implementation.

Figure 5:
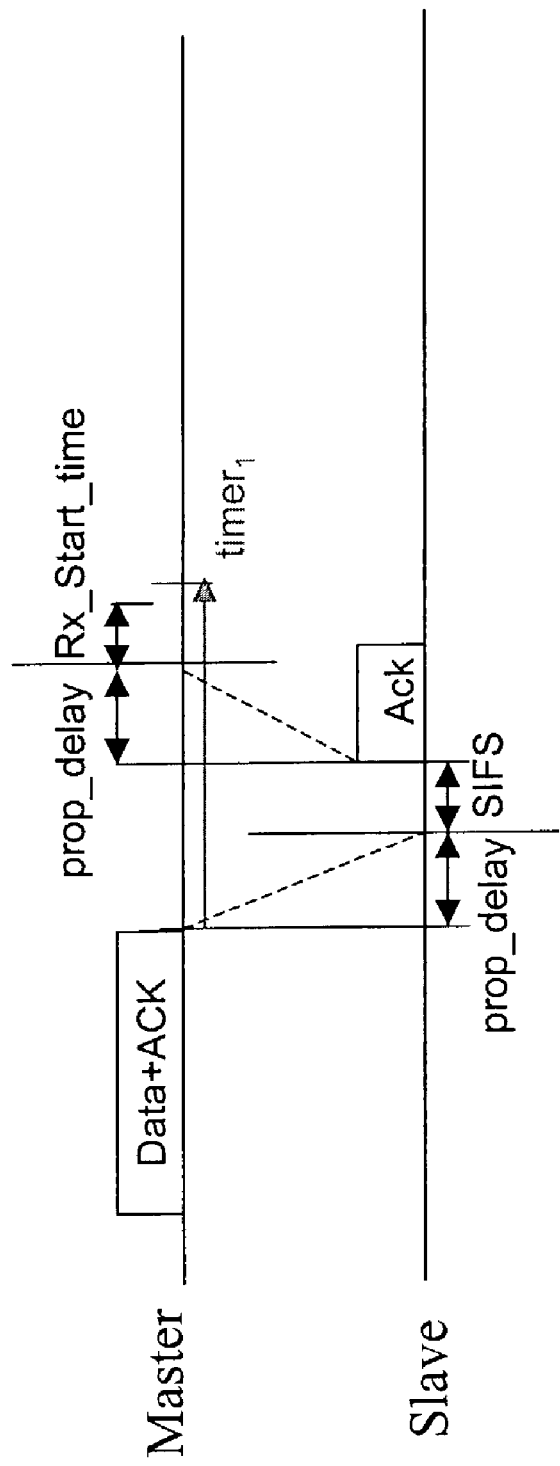
FIG. 5 is a timing diagram depicting criteria for retransmission according to one embodiment of the present invention.

FIG. 5 is a timing diagram depicting criteria for retransmission according to one embodiment of the present invention. Both bridges maintain a timer to retransmit packets when the expected acknowledgement is not received at the expected time. The timer is started at the end of each transmission (each burst in burst mode, each packet in alternating mode) and reset at the beginning of packet reception. A response is expected in a time equivalent to twice the propagation delay plus SIFS plus the receiver processing time to detect start of a packet.

Figure 6:
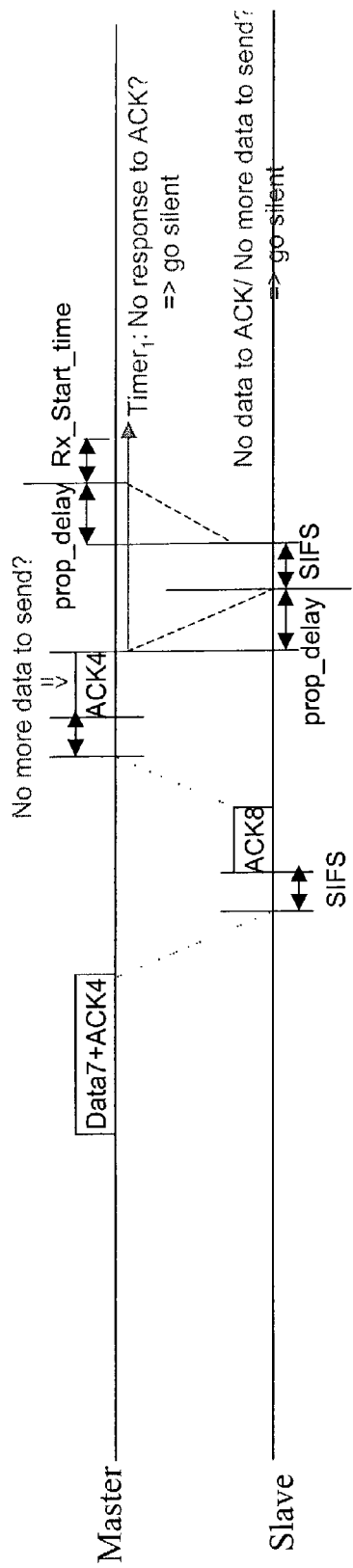
FIG. 6 is a timing diagram depicting criteria for going silent according to one embodiment of the present invention.

FIG. 6 is a timing diagram depicting criteria for going silent according to one embodiment of the present invention. In either alternating or burst mode, after all packets are acknowledged or released (due to expired retransmissions), the bridges may go silent if there are no more packets to send. This has the effect of reducing unnecessary interference to neighboring networks.

When the master node has no more packets to send, it polls the slave with an acknowledgement to release the medium. The slave responds with a data packet if it has traffic to send; otherwise the slave goes silent. When the master does not receive a response to its acknowledgement packet, it goes silent as well.

According to one embodiment of the present invention, multiple packets can be concatenated together into the same MAC protocol data unit (PDU). A concatenation format specifies the number of involved packets and lengths, the address fields, and the priorities of the packets involved. Concatenated packets are numbered, delivered, and acknowledged in the same way as other packets. In the event of an error, all packets in the concatenation will be considered as lost, as the acknowledgement sequence number will indicate the first sequence number in the concatenation. The entire concatenated packet is retransmitted in the event of loss. It is therefore preferable to utilize concatenation to further reduce MAC layer overhead when channel conditions are sufficiently favorable that retransmissions are rare. The maximum concatenation size should be selected based on jitter requirements necessary to support voice communication.

The protocols described herein can beneficially handle voice traffic. In one implementation, transmitted packets are selected from 8 priority queues on a strict priority basis, i.e., the next packet to be transmitted is taken from the highest priority non-empty queue. Because the link is point-to-point with no need for contention, polling, or reservation, guaranteed quality of service may be provided by use of the highest priority queue. Voice packets and voice signaling packets are preferably assigned to this highest priority queue. Retransmission of voice packets is optional and when retransmissions are to be suppressed, the "No ACK" bit is set. Consecutive voice packets may be sent in burst mode. Voice packets may also be concatenated together as described above, especially where multiple calls are being carried.

FIGS. 7-12 depict packet structures according to one embodiment of the present inventions. Fields that have already been described in reference to one packet type will not be explained in reference to further packet types. Above each field the designator zB gives the number of bytes, z.

Figure 7:
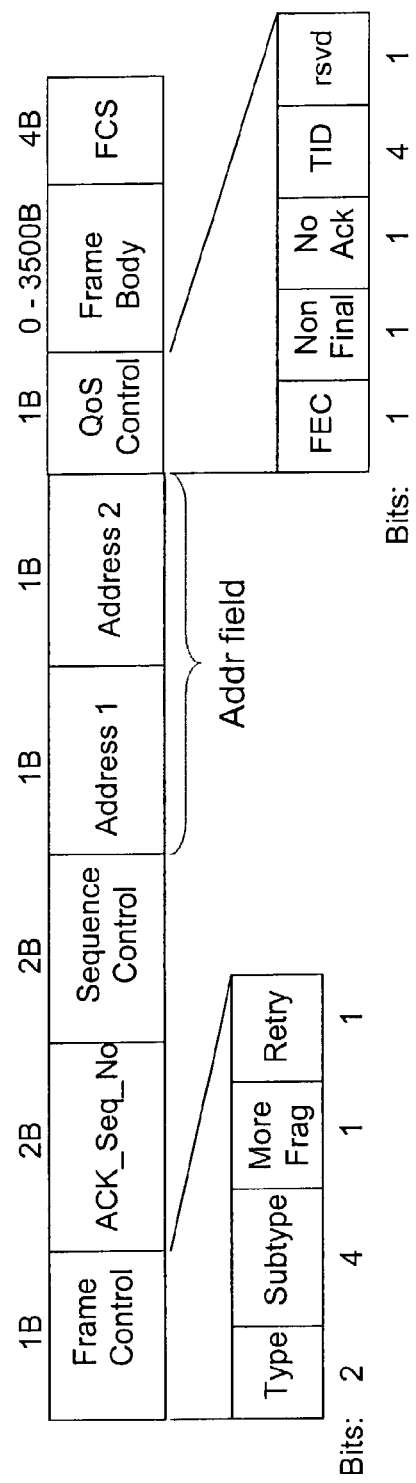
FIG. 7 depicts a data plus acknowledgement packet according to one embodiment of the present invention.

FIG. 7 depicts a data plus acknowledgement packet according to one embodiment of the present invention. A Frame Control field includes Type, Subtype, More Frag, and Retry subfields. The type and subtype subfields define the packet type (i.e., data plus acknowledgement, acknowledgement, concatenated data plus acknowledgement, data plus burst acknowledgement, concatenated data plus burst acknowledgement, burst acknowledgement, and burst acknowledgement). A "More Frag" field implements fragmentation as specified by the 802.11 standard by indicating if there are more fragments to be sent. The retry subfield identifies the packet as a repeat transmission.

The ACK_Seq_No field identifies the acknowledgement sequence number as described above. (When fragmentation is used, this field includes the packet sequence number and fragment number.) The Sequence Control field identifies the packet sequence number (including a fragment number where appropriate) as described above. The Address fields identify the MAC layer source and destination addresses of the packet. Note that these need not be the addresses of the transmitting bridge and receiving bridge since packets may be relayed within an 802.11 network. These addresses may be compressed down to 1 byte each by use of an index table. The presently described protocol explicitly leaves out the transmitting and receiving bridge addresses, recognizing that they are unnecessary in a point-to-point protocol.

A QoS Control field includes the following subfields: FEC, Non-Final, No Ack, TID, and reserved. The FEC subfield indicates whether or not forward error correction is used. This subfield is not used in a preferred implementation of the point-to-point protocol. The Non-Final Subfield is also not used in a preferred implementation of the point-to-point protocol. The role of the No Ack field has been described above. The TID subfield indicates the priority level of the packet and whether the packet is a voice packet. The Frame Body field includes the packet contents. The FCS field includes a cyclic redundancy check computed over the packet body as specified by the 802.11 standard.

Figure 8:
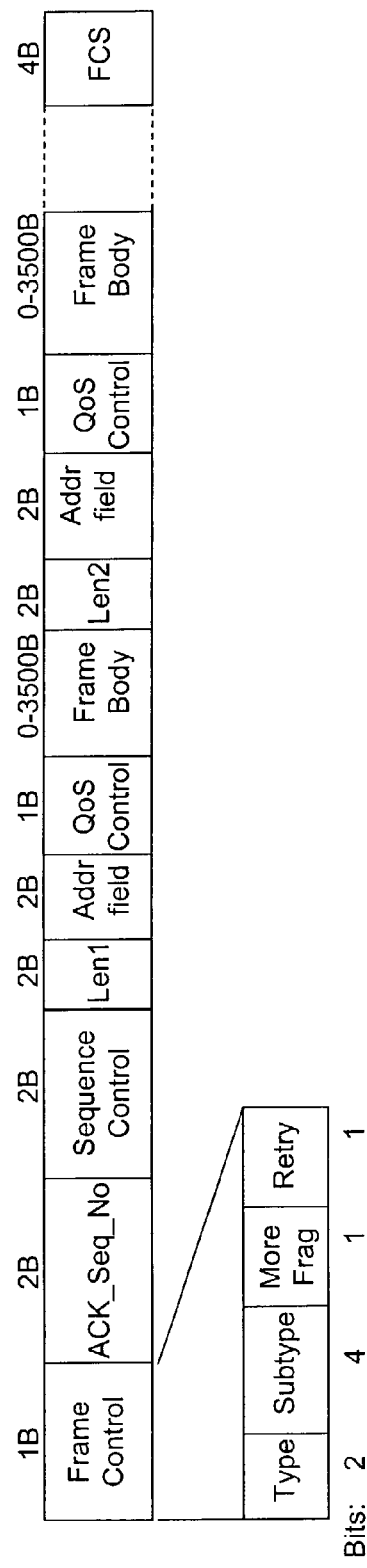
FIG. 8 depicts a concatenated data and acknowledgement packet according to one embodiment of the present invention.

FIG. 8 depicts a concatenated data and acknowledgement packet according to one embodiment of the present invention. For each packet included in the concatenation, there is a length field, Lena, indicating the length of the frame body in bytes. The address fields, QOS control field, and frame body are set out separately for each packet in the concatenation.

Figure 9:
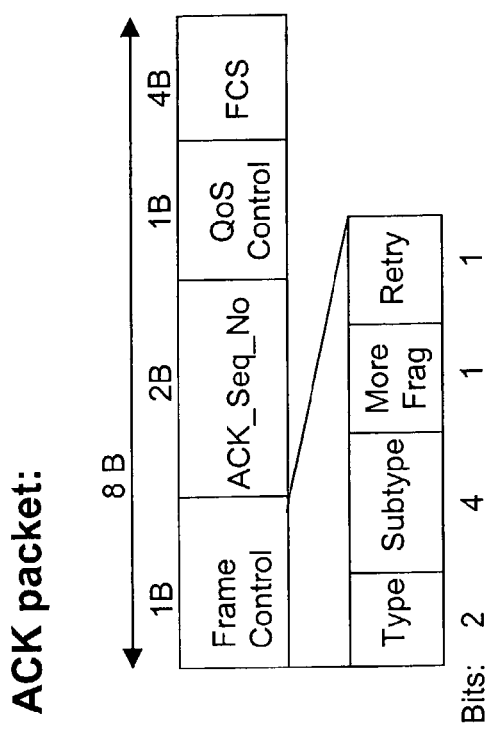
FIG. 9 depicts an acknowledgement packet according to one embodiment of the present invention.
Figure 10:
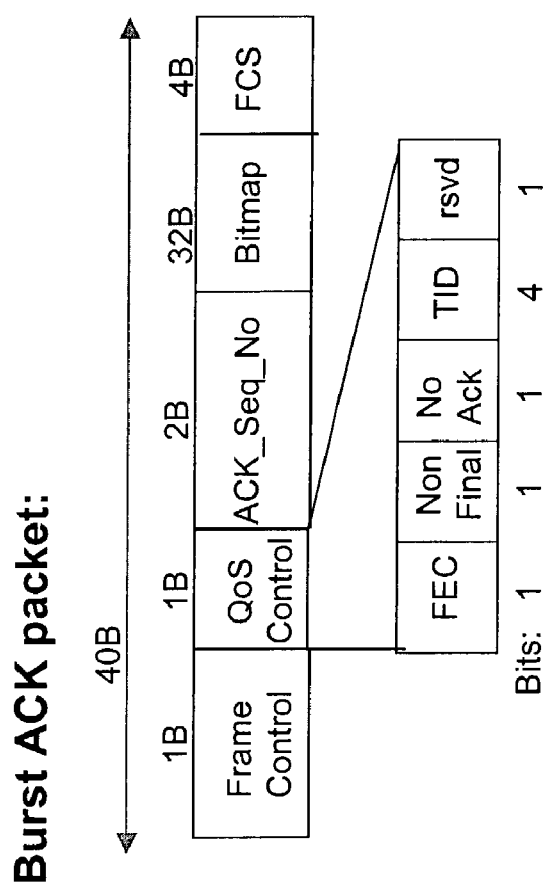
FIG. 10 depicts a burst acknowledgement packet according to one embodiment of the present invention.

FIG. 9 depicts an acknowledgement packet according to one embodiment of the present invention. FIG. 10 depicts a burst acknowledgement packet according to one embodiment of the present invention. The Bitmap field indicates which packets have been received successfully and which ones require retransmission.

Figure 11:
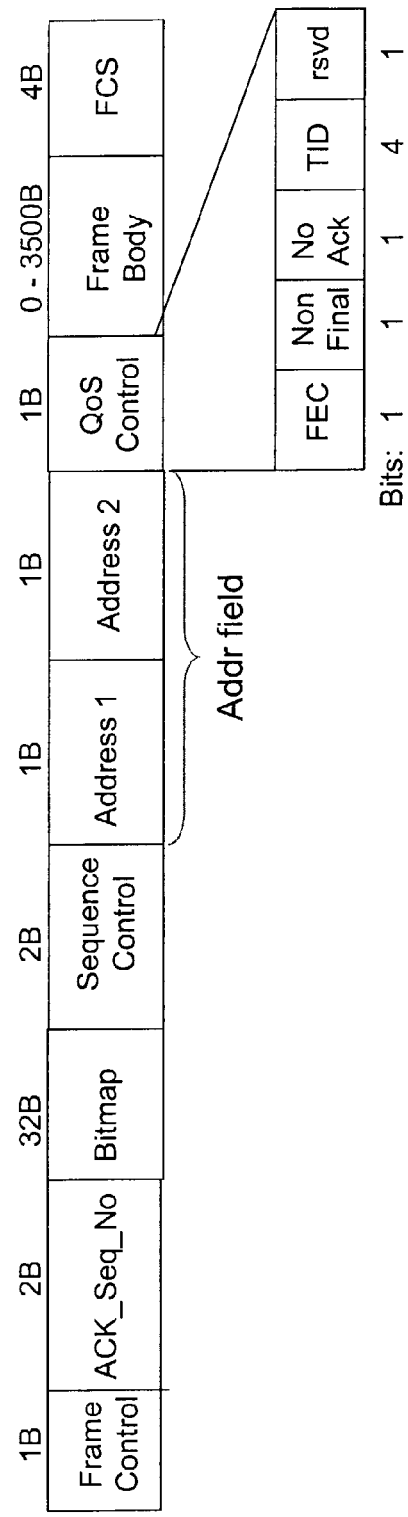
FIG. 11 depicts a data plus burst acknowledgement packet according to one embodiment of the present invention.
Figure 12:
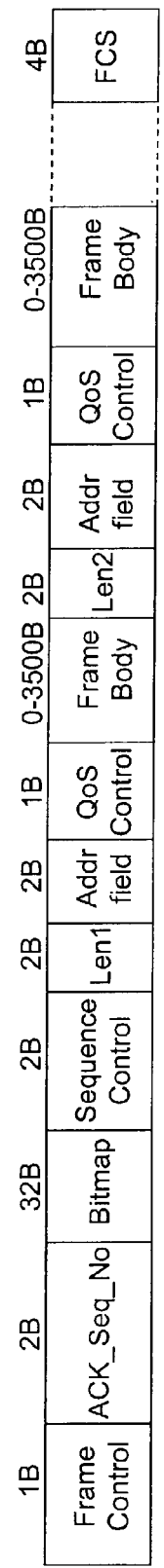
FIG. 12 depicts a concatenated data plus burst acknowledgement packet according to one embodiment of the present invention.

FIG. 11 depicts a data plus burst acknowledgement packet according to one embodiment of the present invention. FIG. 12 depicts a concatenated data plus burst acknowledgement packet according to one embodiment of the present invention.

It will be appreciated that the above-described packet formats benefit from the recognition that certain types of information are unnecessary due to the point-to-point nature of the link. For example, a duration field is unnecessary. Also, it is unnecessary to include addresses of the transmitting and receiving bridge since they are always the same. These efficiencies result in a greatly reduced header and therefore lower MAC layer overhead requirements.

In addition to the reduced header length, the use of acknowledgement piggybacking, concatenation, and burst mode further increase MAC layer efficiency and throughput, thus allowing one to realize the potential of physical layer advances. The use of strict priority queuing allows for support of toll-quality voice connections.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. A method for operating an IEEE 802.11 node to participate in a point-to-point wireless communication link, said method comprising:

sensing a medium shared with a node constituting an opposite side of said point-to-point wireless communication link to determine if a transmission is detected, one of said nodes configured as a master bridge and the other of said nodes configured as a slave bridge;

if a transmission is detected on said shared medium, deferring transmission by a period of time, wherein said period of time for said master bridge is shorter than said period of time for said slave bridge;

exchanging control of said shared medium with said node constituting an opposite side of said point-to-point link without contention and without polling; and transmitting data when in control of said shared medium;

wherein transmitting said data comprises selecting one of modes of operation, said modes of operation comprising an alternating mode wherein the IEEE 802.11 node transmits a first packet and then transmits a second packet after receiving an acknowledgement for said first packet, and a burst mode wherein the IEEE 802.11 node transmits a plurality of packets consecutively in a burst and requests acknowledgement at the end of said burst.

2. The method of claim 1 wherein transmitting comprises: transmitting a packet that includes a source address and a destination address but not a transmitting station address and a receiving station address.

3. The method of claim 2 further comprising presenting said source address and said destination address in compressed form within said packet.

4. The method of claim 1 wherein transmitting comprises: concatenating a series of MAC layer packets to form a concatenated packet; and
transmitting said concatenated packet.

5. The method of claim 1 wherein transmitting comprises: transmitting a series of consecutive packets before giving up control of said shared medium.

6. The method of claim 1 wherein transmitting comprises: transmitting an acknowledgement packet including piggybacked data.

7. The method of claim 1 wherein transmitting comprises: selecting a packet to transmit based on strict priority from a series of priority queues.

8. The method of claim 7 wherein voice packets are assigned a highest priority to implement Guaranteed Quality of Service.

9. The method of claim 1 wherein transmitting comprises: transmitting a packet that does not include a duration field.

10. The method of 1 wherein said period of time transmission is deferred by said IEEE 802 node operating as said master bridge comprises Point Coordination Function Interframe Space and wherein said period of time transmission is deferred by said IEEE 802 node operating as said slave bridge comprises Distributed Coordination Function Interframe Space.

11. The method of claim 1 wherein transmitting said data comprises transmitting a packet comprising an acknowledgement number indicating a next packet sequence number expected.

12. The method of claim 11 further comprising retransmitting said packet if a packet containing said next packet sequence number expected is not received and said packet is not a voice packet.

13. Apparatus for operating an IEEE 802.11 node to participate in a point-to-point wireless communication link, said apparatus comprising:
a MAC layer block configured to:
sense a medium shared with a node constituting an opposite side of said point-to-point wireless communication line to determine if a transmission is detected, one of said nodes configured as a master bridge and the other of said nodes configured as a slave bridge, if a transmission is detected on said shared medium, defer transmission by a period of time, wherein said period of time for said master bridge is shorter than said period of time for said slave bridge, and exchange control of said shared medium with said node constituting an opposite side of said point-to-point link without contention and without polling; and a physical layer block through which said MAC layer transmits data when in control of said shared medium;

wherein the MAC layer block is configured to select one of modes of operation, said modes of operation comprising an alternating mode wherein the physical layer block transmits a first packet and then transmits a second packet after receiving an acknowledgement for said first packet, and a burst mode wherein the physical layer block transmits a plurality of packets consecutively in a burst and requests acknowledgement at the end of said burst.

14. The apparatus of claim 13 wherein said MAC layer block transmits a packet that includes a source address and a destination address but not a transmitting station address and a receiving station address.

15. The apparatus of claim 14 wherein said MAC layer block compresses at least one of said source address and said destination address prior to insertion within said packet.

16. The apparatus of claim 13 wherein said MAC layer block concatenates a series of MAC layer packets to form a concatenated packet and transmits said concatenated packet.

17. The apparatus of claim 13 wherein said MAC layer block transmits a series of consecutive packets before giving up control of said shared medium.

18. The apparatus of claim 13 wherein said MAC layer block transmits an acknowledgement packet including piggybacked data.

19. The apparatus of claim 13 wherein said MAC layer block selects a packet to transmit based on priority.

20. The apparatus of claim 13 wherein said MAC layer block suppresses transmissions when there is no data to send.

21. The apparatus of claim 13 further comprising a MAC layer processor that receives said data from a higher layer protocol and inserts said data into said packets, wherein said packets do not include a duration field.

22. The apparatus of claim 13 further comprising a retransmission buffer to allow for retransmission if an acknowledgement packet containing an expected next packet sequence number is not received within a specified time.

23. The apparatus of claim 1 wherein all of said plurality of packets transmitted in said burst mode except a final packet in said burst, comprise a bit set to instruct the node at the opposite side of said point-to-point link to delay transmittal of an acknowledgement packet.

24. Apparatus for operating an IEEE 802.11 node to participate in a point-to-point wireless communication link, said apparatus comprising:
means for sensing a medium shared with a node constituting an opposite side of said point-to-point wireless communication link to determine if a transmission is detected, one of said nodes configured as a master bridge and the other of said nodes configured as a slave bridge;

if a transmission is detected on said shared medium, means for deferring transmission by a period of time, wherein said period of time for said master bridge is shorter than said period of time for said slave bridge;

means for exchanging control of said shared medium with said node constituting an opposite side of said point-to-point link without contention and without polling; and means for transmitting data when in control of said shared medium;

wherein means for transmitting said data comprises means for selecting one of modes of operation, said modes of operation comprising an alternating mode wherein the IEEE 802.11 node transmits a first packet and then transmits a second packet after receiving an acknowledgement for said first packet, and a burst mode wherein the IEEE 802.11 node transmits a plurality of packets consecutively in a burst and requests acknowledgement at the end of said burst.

* * * * *